United States Patent Office 3,546,220
Patented Dec. 8, 1970

3,546,220
2,3-DIHYDRO-1H-PYRIDO-[2,3-b][1,4]THIAZINES
Robert George Stein and Leo Ralph Swett, Waukegan, Ill., assignors to Abbott Laboratories, North Chicago, Ill., a corporation of Illinois
No Drawing. Filed Aug. 1, 1966, Ser. No. 569,073
Int. Cl. C07d *93/12*
U.S. Cl. 260—243        7 Claims

ABSTRACT OF THE DISCLOSURE

New 2,3-dihydro - 1H - pyrido-[2,3-b][1,4]-thiazines, optionally carrying single ring substituents and their method for preparation are described. The new compounds and their non-toxic acid addition salts are useful as anti-inflammatories.

---

The present invention is directed to a series of heterocyclic compounds; more particularly it is directed to compounds of the formula:

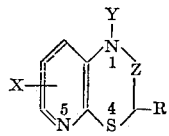

wherein Z is a methylene group or carbonyl, R and X each represents hydrogen or methyl, and Y is hydrogen, methyl, propargyl or 1-dimethylamino-2-propyl, and acid addition salts thereof.

The new compounds and their non-toxic acid addition salts exhibit anti-inflammatory activity after oral administration; other salts are useful in the preparation of the free base or the nontoxic salts. More specifically, the new compounds and their non-toxic acid salts reduce edema in warm-blooded animals by at least 25% of the inflicted area after a single administration of between 10 and 100 mg./kg. of the active compound. The new compounds and their non-toxic addition salts also exhibit antipyretic activity in warm-blooded animals with a single oral dose. In this respect the activity of the new compounds is comparable to that of acetylsalicyclic acid.

The new compounds wherein Z is the carbonyl group can be made by two alternate methods from 2-chloro-3-nitropyridine which may further be substituted by a methyl group in the 4-, 5- or 6-position. In one method, said pyridine derivative is condensed with thioacetic acid or thiolactic acid or their loweralkyl esters and the resulting 3-nitropyridinyl-2-thioacetic acids or corresponding esters of the formula

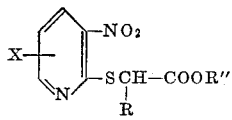

wherein R" is H or loweralkyl are hydrogenated to the corresponding 3-aminopyridine derivative which undergoes ring closure by simple heating. In the other method, the above 3-nitropyridine derivative is first reduced to the corresponding 3-aminopyridine derivative which is then condensed with thioacetic acid or thiolactic acid or loweralkyl esters thereof. The compounds wherein Z is a methylene group are made from the above compounds carrying the carbonyl group in the 2-position of the above pyridothiazine by reduction with lithium aluminum hydride.

To better understand the process of preparing the new compounds, reference is made to the following examples which are given only as illustrations and are not meant to limit the invention in any respect.

EXAMPLE 1

Method A.—A solution of 37.9 g. of ethyl mercaptoacetate in 50 ml. of ethanol is slowly added to a solution of 27.7 g. of sodium bicarbonate in 300 ml. of water. The clear solution is stirred for 30 minutes at room temperature followed by the slow addition of 50 g. of 2-chloro-3-nitropyridine in 100 ml. of ethanol. After completion of the addition, the mixture is refluxed for 12 hours after which time 150 ml. of water are added. Upon cooling of the mixture in an ice bath, a solid precipitates. The crude reaction product formed in this manner is filtered and crystallized from ethanol and water to yield 48.5 g. of 2-carbethoxymethylthio-3-nitropyridine melting at 56–57° C.

The new intermediate is dissolved in 300 ml. of 2-methoxyethanol and hydrogenated in a Parr shaker in the presence of Raney nickel at 2 to 3 atm. hydrogen pressure. After 3 moles of hydrogen are absorbed, the catalyst is removed by filtration and the resulting filtrate is concentrated leaving an oil. This oil is dissolved in 500 ml. of xylene, the solution is refluxed for 12 hours and subsequently concentrated to form a dark residue. Crystallization of the residue from methanol yields 17.4 g. of 2,3-dihydro-1H-pyrido-[2,3-b][1,4]-thiazin-2-one melting at 209–211° C.

When in the above process the ethyl mercaptoacetate is replaced by thioacetic acid, essentially the same result is obtained. The corresponding 2-carboxymethylthio derivative melts at 133–134° C.

Method B.—A solution of 24 g. of ethyl mercaptoacetate in 50 ml. of 2-methoxyethanol is added over a period of 20 minutes to a solution of 11.2 g. of potassium hydroxide pellets in 100 ml. of water in an ice bath. After completion of the addition, the mixture is stirred for 15 minutes at room temperature and a solution of 25.6 g. of 3-amino-2-chloropyridine in 300 ml. of 2-methoxyethanol is added in one portion. The mixture is refluxed for 16 hours and then concentrated in vacuo to form a solid residue. The solid residue is heated an additional hour in an oil bath at 150° and the resulting product is triturated with 100 ml. of water. The solid is then isolated by filtration and crystallized from methanol to yield 17.5 g. of 2,3 - dihydro-1H-pyrido-[2,3-b][1,4]-thiazin-2-one which shows no melting point depression in a mixture with the compound of Method A.

The 3-amino-2-chloropyridine used above is made from 3-nitro-2-chloropyridine by hydrogenation in the presence of the catalytic amount of Raney nickel.

EXAMPLE 2

A suspension of 5.7 g. of lithium aluminum hydride in 800 ml. of dry ether is cooled in an ice bath to 0–5° C. and 16.6 g. of 2,3-dihydro-1H-pyrido-[2,3-b][1,4]-thiazin-2-one is added in small portions over a period of 30 minutes. After completion of the addition, the mixture is refluxed for 48 hours, and subsequently cooled in an ice bath. The hydride complex and the excess hydride is then decomposed by the careful addition of 3.6 ml. of water followed by the addition of 3.6 ml. of 15% aqueous sodium hydroxide. Another portion of 10.8 ml. of water is added and the new mixture is stirred for three hours at room temperature. The precipitated salt is removed by filtration and the filter cake is washed with several portions of warm methylene chloride. The combined filtrate and wash liquors are evaporated to yield white, crude 2,3-dihydro-1H-pyrido-[2,3-b][1,4]-thiazine which, when crystallized from ethylacetate and pentane leaves 9.3 g. of the pure compound melting at 127–128° C. The corresponding hydrochloride salt melts at 135–137° C.

EXAMPLE 3

By following the procedure shown in Example 1, Method A, but using as the starting material, 3-methylamino-2-chloropyridine, 2,3 - dihydro - 1 - methyl-1H-pyrido-[2,3-b][1,4]-thiazin-2-one melting at 91–93° C. is obtained.

EXAMPLE 4

By following the procedure of Example 2 with the compound described in Example 3, 2,3-dihydro-1-methyl-1H-pyrido-[2,3-b][1,4]-thiazine is obtained. The free base is dissolved in ether and an alcoholic solution of sulfuric acid is added to precipitate the sulfate salt of said base. The sulfate melts at 139–142° C. and has the empirical formula $C_8H_{12}N_2O_4S_2$.

EXAMPLE 5

By following the procedure of Example 1, Method B, but replacing the ethyl mercaptoacetate by an equivalent amount of thiolactic acid, 2,3-dihydro-3-methyl-1H-pyrido-[2,3-b][1,4]-thiazin-2-one melting at 175–176° C. is obtained.

EXAMPLE 6

By following the procedure of Example 1 but using as the starting material 2-chloro-3-nitro-6-methylpyridine, 2,3 - dihydro-6-methy-1H-pyrido-[2,3-b][1,4]-thiazin-2-one melting at 186–187° C. is obtained.

Similarly, the corresponding 7-(or 8-)methylpyridothiazines are obtained by replacing the 2-chloro-3-nitropyridine of Example 1 with 2-chloro-3-nitro-5-(or 4-)methylpyridine.

EXAMPLE 7

By treating the compound described in Example 5 by the method of Example 2, 2,3-dihydro-3-methyl-1H-pyrido-[2,3-b][1,4] - thiazine is obtained. It is dissolved in ether and alcoholic hydrochloric acid is added to form the hydrochloride salt of the free base. The hydrochloride salt melts at 150–152° C.

EXAMPLE 8

By following the procedure of Example 1, Method B, but starting with 3-propargylamino-2-chloropyridine, 2,3-dihydro - 1 - propargyl-1H-pyrido-[2,3-b][1,4]-thiazin-2-one melting at 136–137° C. is obtained.

EXAMPLE 9

By following Method B of Example 1 using 3-(1-dimethylamino - 2 - propylamino)-2-chloropyridine, 2,3-dihydro - 1 - (1 - dimethylamino-2-propyl)-1H-pyrido-[2,3-b][1,4]-thiazin-2-one boiling at 180–185° C. at 2 mm. pressure is obtained.

The same compound is also made by stirring 16.6 g. of the compound of Example 1 in 100 ml. of dimethylformamide, adding thereto 4.8 g. of 50% sodium hydride in a mineral oil dispersion suspended in 150 ml. of dimethylformamide at room temperature, heating the mixture for one hour to 70° C. and cooling it subsequently in an ice bath. A solution of 16.6 g. of 1-dimethylamino-2-bromopropane in 25 ml. of dimethylformamide is then added, the mixture is stirred for one hour at room temperature and 2½ hours at 70° C. and subsequently evaporated under high vacuum. To the resulting oil is added 100 ml. of 5% aqueous hydrochloric acid and the mixture is extracted with two 150 ml.-portions of ether. The aqueous layer is made slightly alkaline by the addition of 10% aqueous sodium hydroxide and extracted with ether. The ether extract is dried over magnesium sulfate and the ether is evaporated to leave the compound identified above as an oil.

EXAMPLE 10

By following the procedure of Example 2 with the compound of Example 9, one obtains 2,3-dihydro-1-(1-dimethylamino - 2 - propyl) - H - pyrido-[2,3-b][1,4]-thiazine boiling at 188–190° C. at 5 mm. pressure.

Although the above examples only show the preparation of the basic compounds and some of the acid addition salts, it will be obvious to those skilled in the art how to prepare the other acid addition salts thereof. These acid addition salts are sometimes more desirable for pharmaceutical use since they are more soluble in the usual pharmaceutically-acceptable vehicles. Of particular interest are the non-toxic acid addition salts of the above compounds, the most common ones of which are the hydrochlorides, sulfates, phosphates, acetates and citrates.

It will be seen from the above examples that the ring-closure forming the thiazine portion of the new pyridothiazines is effected by simple heating: comparable results are obtained by carrying out this condensation with the free thioalkylcarboxylic acid or a loweralkyl ester thereof. The condensation between the 2-chloro-3-nitro-pyridine with the appropriate thioacetic acid derivative can be carried out prior to or subsequent to the reduction of the nitro group to the amino group in the pyridine derivative. When the compounds of the above formula are desired wherein Y is different from hydrogen, it is possible to first make the corresponding N-substituted 3-amino-2-chloropyridine derivative and then condense the latter with the thioacetic acid derivative. It is equally feasible and sometimes preferred to first form the 1-unsubstituted pyridothiazin-2-one and subsequently react the latter with the halide of the desired radical for the 1-position, e.g. with propargyl bromide, methyl iodide or 1-dimethylamino-2-propyl chloride. The condensation between the 3-amino-(or 3-nitro)pyridyl derivative and the thioacetic acid derivative is carried out in the presence of a polar solvent such as water, ethanol, methoxyethanol or mixtures thereof, and in the presence of a base such as potassium bicarbonate, sodium carbonate, sodium hydroxide, or, an inert organic solvent, such as pentane, beznene, xylene, together with sodamide, potassium hydride or other metalating agents may be used. Heating this mixture for at least one hour will yield the condensation product. When the initial pyridyl derivative has an amino group at the 3-position, ring-closure will occur simultaneously. When starting with the 3-nitropyridyl derivative, ring-closure will occur simultaneously with the hydrogenation of the nitro group.

I claim:
1. A compound of the formula

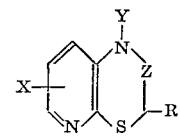

wherein Z is a methylene or carbonyl, R and X each represents hydrogen or methyl and Y is hydrogen, methyl, propargyl or 1-dimethyl amino-2-propyl, and acid addition salts thereof.

2. The compound of claim 1 wherein said acid addition salt is formed with a non-toxic acid.

3. The compound of claim 1 wherein R, X and Y each is hydrogen and Z is the carbonyl group.

4. The compound of claim 1 wherein X, Y and R each is hydrogen and Z is a methylene group.

5. The compound of claim 1 wherein R is methyl, X and Y each is hydrogen and Z is the carbonyl group.

6. The compound of claim 1 wherein R and X each is hydrogen, Y is 1-dimethylamino-2-propyl and Z is the methylene group.

7. The compound of claim 1 wherein R and X each is hydrogen, Y is propargyl and Z is the carbonyl group.

References Cited

Takahashi et al., J. Pharm. Soc. (Japan) vol. 77, pp. 481–4 (1957).

Takahashi et al., Chemical Abstracts, vol. 50, cols. 10101–2 and 13032–3 (1956).

HENRY R. JILES, Primary Examiner

J. M. FORD, Assistant Examiner

U.S. Cl. X.R.

260—294.8, 999